United States Patent [19]
Wold et al.

[11] Patent Number: 5,949,678
[45] Date of Patent: *Sep. 7, 1999

[54] METHOD FOR MONITORING MULTIVARIATE PROCESSES

[75] Inventors: Svante Wold, Vännäs; Karl Olov Lasse Sundin, Luleå, both of Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/666,346

[22] PCT Filed: Dec. 15, 1994

[86] PCT No.: PCT/SE94/01208

§ 371 Date: Oct. 16, 1996

§ 102(e) Date: Oct. 16, 1996

[87] PCT Pub. No.: WO95/18420

PCT Pub. Date: Jul. 6, 1995

[30] Foreign Application Priority Data

Dec. 22, 1993 [SE] Sweden ................... 9304246

[51] Int. Cl.$^6$ ........................................ G05B 19/42
[52] U.S. Cl. ................. 364/188; 364/149; 364/150; 364/151
[58] Field of Search ........................ 364/188, 149, 364/158, 126, 151, 578, 513, 138, 468.01, 468.02, 468.03, 148, 150, 152, 191, 139

[56] References Cited

U.S. PATENT DOCUMENTS

| | | | |
|---|---|---|---|
| 4,965,742 | 10/1990 | Keirik | 364/513 |
| 5,196,997 | 3/1993 | Kurtzberg et al. | 364/152 |
| 5,249,120 | 9/1993 | Foley | 364/401 |
| 5,402,333 | 3/1995 | Cardner | 364/151 |
| 5,408,405 | 4/1995 | Mozumder et al. | 364/151 |
| 5,457,625 | 10/1995 | Lim et al. | 364/149 |
| 5,481,465 | 1/1996 | Itoh et al. | 364/468 |
| 5,488,561 | 1/1996 | Berkowitz et al. | 364/165 |
| 5,610,843 | 3/1997 | Chou | 364/553 |
| 5,617,321 | 4/1997 | Frizelle et al. | 364/468.1 |

OTHER PUBLICATIONS

ABB tidning Apr. 1993, "Övervakning och styrning av processförlopp i flera dimensioner", Bert Skarberg et al.

Control and Instrumentation, B.R. Upadhyaya, Nuclear Safety, vol. 26, No. 1, pp. 32–43, Jan.–Feb. 1985.

Power Signal Validation, Lin et al., Nuclear Technology, vol. 84, pp. 7–13, Jan. 1989.

Time Variable Parameter and Trend Estimation, Peter C. Young, Juornal of Forecasting, vol. 13, 179–210, 1994.

*Primary Examiner*—William Grant
*Assistant Examiner*—Ramesh Patel
*Attorney, Agent, or Firm*—Burns, Doane, Swecker & Mathis, L.L.P.

[57] ABSTRACT

Variables associated with a multivariate process are monitored on a periodic basis. As a result of an observation of the variables, a residual standard deviation between the monitored variable values and a predictive model can be determined. The residual standard deviation is plotted as a series of connected points. Through the use of an adaptive model, the observations of the variables, and in turn, the residual standard deviation and the predictive model are adapted to changes in the multivariate process.

16 Claims, 6 Drawing Sheets

$$EWMA = \hat{Y}_{t+1} = \hat{Y}_t + \lambda e_t = \hat{Y}_t + \lambda (Y_t - \hat{Y}_t)$$

METHOD FOR MONITORING MULTIVARIATE PROCESSES

TECHNICAL FIELD

The present invention relates to method of monitoring an industrial process which is dependent on a large number of parameters, available through measured data, in a way which makes it possible to control the process to the desired conditions by allowing the relevant variables of the process to be represented by the axes in a linear space with as many dimensions as the number of variables, whereupon the process is projected onto a plane or a three-dimensional room, such that a calculated model of the process is obtained on-line and by comparing the model of the process with a reference model of the process such that a distance to the reference model is obtained, whereupon, when observing a drift of some parameter, the process can be restored to at least one norm range for the process by acting upon a deviating variable.

BACKGROUND ART

For obtaining, for instance, the desired quality of a manufactured produce in a manufacturing process with the best economy or otherwise monitoring an industrial process or industrial application, it is necessary to control the processes as efficiently and optimally as possible. A manufacturing process includes many important variable quantities (here only referred to as variables), the values of which are affected by the variations of the variables during the course of the process. The optimum result is achieved if the process-monitoring operator or the process-monitoring member is able to handle and control all the process-influencing variables in one and the same operation.

A conventional method of optimizing a process is to consider one variable at a time only, one-dimensional optimization. All the variables are fixed except one, whereupon the non-fixed variable is adjusted to an optimum result. Thereafter, the free variable is fixed and one of the other variables adjusted, and so on.

When the process variables have been set in this way one by one, it is supposed that the best working point of the process has been obtained. However, the fact is that this is not the whole truth. The process may still be far from its optimum working point, since the method does not take the mutual influence of the process variables into account. The difficulty of this method is to obtain a total overview of the process based on a number of mutually independent process variables as necessitated by such a view. It is only when the relationship between these variables can be interpreted correctly that the process operator gets a real overview and understanding of the process.

An operator is limited by his or her human ability to understand and control only a limited number of variables per unit of time. A process monitoring system measures up to hundreds of variables, of which perhaps some 20 more or less directly control the process. Such a monitoring system requires a computer which can continuously register if and when slight variations occur in any of the variables.

A model of a process is realized substantially by two different types of modelling techniques, mechanistic and empirical modelling. Mechanistic models are used, for example, in physics. Data are used to discard or verify the mechanistic model. A good mechanistic model has the advantage of being based on established theories and is usually very reliable over a wide range. However, the mechanistic model has its limitations and is only applicable for relatively small, simple systems, whereas it is insufficient, if even possible to use, for building an axiom around a complex industrial process. Many attempts have been made to model processes with the aid of mechanistic models based on differential equations. An important disadvantage of these models, however, is that they are greatly dependent on the dependence of certain parameters on each other. Such parameters with great dependence on each other must be determined for the model to function. In the majority of cases it is very difficult to quantify them in a reliable manner. A consequence of this is that it is very difficult to obtain mechanistic models that work in practice.

In empirical modelling the model is based on real data, which, of course, requires good-quality data. Process data consist of many different measured values. In other words, process data are multivariate, which presupposes multivariate techniques for process data to be modelled and illustrated. Different statistical methods exist for multivariate modelling. Traditional multivariate modelling technique, as for example multiple linear regression (MLR), assume independent and error-free data. For that reason, such technique cannot handle process data, since they are highly interdependent and, in addition, influenced by noise.

A solution to the above problems is to use projection technique. This technique is capable of selecting the actual variation in data and expressing this information in so-called latent (underlying) variables. The technique is described in ABB Review April, 1993, Bert Skagerberg, Lasse Sundin. The projection technique is most advantageous for obtaining a fast overview of a complex process. The two projection techniques, PCA and PLS, that is, Principal Component Analysis and Projection to Latent Structures, are tailor-made for solving problems such as process overview and identification of relationships between different process variables.

Models created with these two methods can be executed directly (on-line) in the process information system and can be used for process monitoring. PLS is highly suitable for predicting various quality-related variables, which are normally difficult to measure or sometimes even impossible to measure routinely since they occur late in the process.

Figure 1:
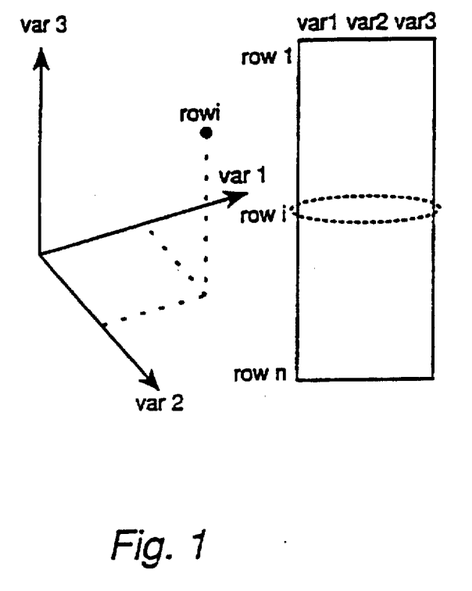
FIG. 1 shows how collected data can be represented in a coordinate system with as many dimensions as the number of variables. An observation of the process represented as a row in a matrix with variable values gives rise to a point in the coordinate system.
Figure 2:
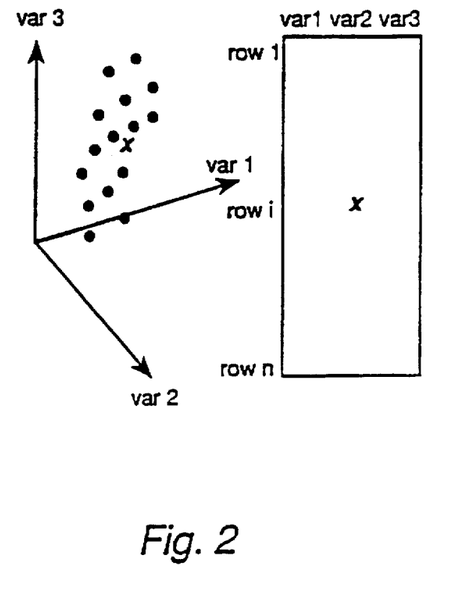
FIG. 2 shows a swarm of points, each one representing an observation of the process, in the coordinate system.

Modelling by means of projection techniques (PCA, PLS) is best explained by the use of simple geometry in the form of points, lines and planes. Process data are usually listed in the form of tables, wherein a row represents a set of observations, that is, registration of variable values, in the process at a certain time. For practical reasons, and for the sake of clarity, the description will be restricted in the following to a data table with three variables, that is, three columns, which can be illustrated geometrically with the aid of a three-dimensional coordinate system (FIG. 1), where the variables in the process are represented by the axes in the coordinate system. However, the method functions for an arbitrary number of variables, K, where K>3, e.g. K=50 or K=497. An observation of the relevant variables in the process at a certain time may here be represented by a point in the coordinate system which is common to all variables, which means that the measured value of each variable corresponds to a coordinate for the respective axis. Mathematically, independently of the number of coordinates, a row in the table still corresponds to a point. All n rows in the table then correspond to a swarm of points (FIG. 2). The mathematical procedure for describing a process with K relevant variables is handled in the same way by the observations at each time being represented by a point in a multidimensional room with K coordinates.

The projection method works on the assumption that two points that lie close together are also closely related in the process.

Figure 3:
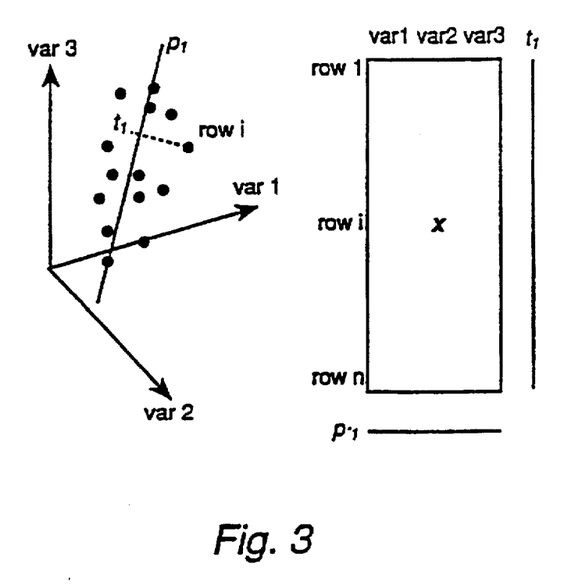
FIG. 3 shows how a first principal direction of the point swarm is formed.

The data set may now be projected to latent variables in a series of simple geometrical operations as follows:

The midpoint in the data set is calculated. This calculated point is called x. The midpoint coordinates correspond to the mean value of all the variables in the system (FIG. 3).

Starting from the midpoint x, a first straight line, p1, is drawn, which is adapted to the data set such that the distance to the line for the individual points is as small as possible. This line corresponds to the direction in the data set which explains the greatest variation in the process, that is, the dominating direction in the data set and is referred to as the first principal direction. The direction coefficients of this line are combined in the loading vector p1. Each point in the data set is then projected orthogonally to this line. The coordinates from the projection of all the points to the line form a new vector $t_1$. (Each point gives a value, here called "score", as a component in the vector $t_1$.)

The new vector ($t_1$) is usually called score vector and describes the first latent variable. This latent variable expresses the most important direction in the data set and is a linear combination of all three variables (or in a multi-dimensional system all K variables involved). Each variable has an influence on the latent variable which is proportional to the size of the direction coefficient in the loading vector $p_1$.

Figure 4:
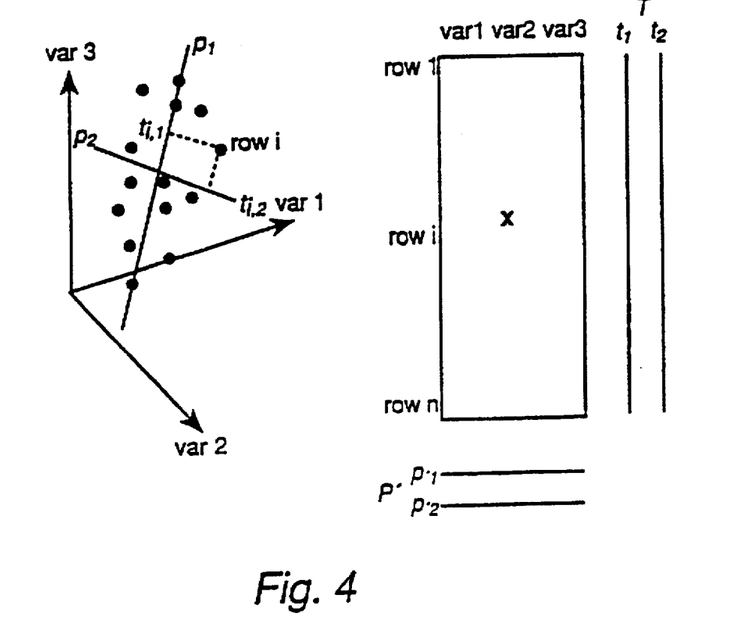
FIG. 4 shows how a second principal direction of the point swarm is formed.

Even if the line, the first principal direction, P1, given by the loading vector, $p_1$, according to the above is one that most closely agrees to the data set, it can still be seen from FIG. 4 that the deviations from the line are relatively large. A second line, p2, may be adapted to the point swarm which represents data in the process. This second line, p2, is orthogonal to the first line, p1, and describes the next most important direction in the point swarm (FIG. 4) and is referred to as the second principal direction. The score vector $t_2$ and the direction coefficient $p_2$ are interpreted analogously to $t_1$ and p1.

Analogously, a third projection line can be constructed with the direction $p_3$ and the score vector $t_3$. However, the value of computing a third principal component in this three-dimensional example is limited, since the resulting three latent variables $t_1$, $t_2$ and $t_3$ only represent a rotated version of the three-dimensional coordinate system.

If, instead, a look is taken at the projection plane which is defined by the first two principal directions, $p_1$ and $p_2$, it can be determined that this plane describes the point swarm well in two dimensions only. The advantage of this is that points projected onto a plane reproduce information which emanates from variables in three dimensions. This is one of the reasons for using PCA to analyze a complex data structure. From a number of variables a small number of underlying latent variables may be obtained, these latent variables describing the main part of the systematic information about current process data. From experience, it has proved that more than 2–6 latent variables are not required. This can also be shown theoretically. The latent variables provide an overview of the data set and can be presented in the form of different types of diagrams or graphic images. Part of the variation of the data set will remain after the latent variables have been extracted and are called residuals (deviations). These contain no systematic information and may therefore be regarded as superfluous and are often referred to as noise.

According to one approach, the projection plane, defined by the lines $p_1$ and $p_2$, may be seen as a two-dimensional window into the multidimensional (in the example the three-dimensional) world. The basic idea behind PCA is to construct such a projection window, providing the viewer with a picture of the multidimensional data set. Consequently, PCA ensures the best possible window, that which contains the optimum picture of the data set. Further, the window can be saved and displayed graphically. The projection window visualized on a computer screen provides an operator, for example, with an overview of a complex process.

The projections described above are essentially a geometrical interpretation of the principal component analyses which have proved to be very suitable for obtaining an overview of process data. Normally, it is sufficient also among hundreds of variables to calculate about three principal components to describe the principal information in the data set. Typical of the PCA method, when applied to process data, is that the system easily selects a strong first component, a less important second component, and a third component describing little but systematic information.

The PCA method is suitable to use for analyzing blocks of process data. Questions which may be answered in an industrial process by means of PCA are:

Overview or a quantity of data

Classification (e.g. if the process continues normally or if it deviates)

Real-time monitoring (e.g. to track the process conditions and discover an incipient deviation as early as possible).

Another important problem is to identify relationships between process data, X, and more quality-related data, Y. This type of relationships are difficult to analyze, if even possible using traditional modelling techniques, since the relationships are often hidden in complex interactions and correlation patterns involving different process variables.

Figure 5:
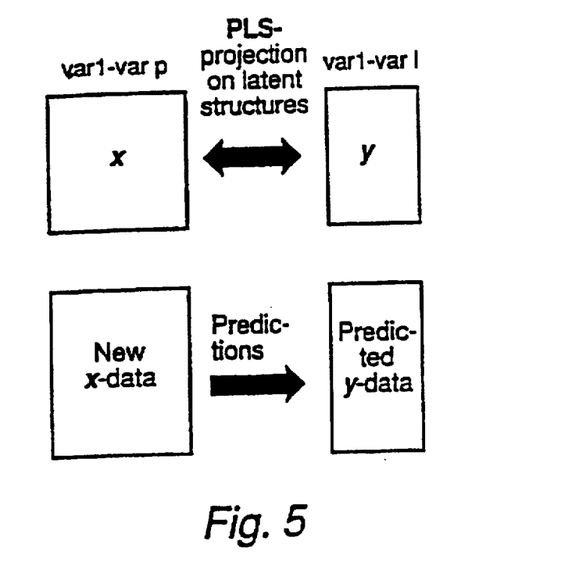
FIG. 5 illustrates how the PLS method models and identifies dependencies between two data sets, for example measured process data and quality-related data, which makes possible an immediate prediction of the occurrence of the process.
Figure 6:
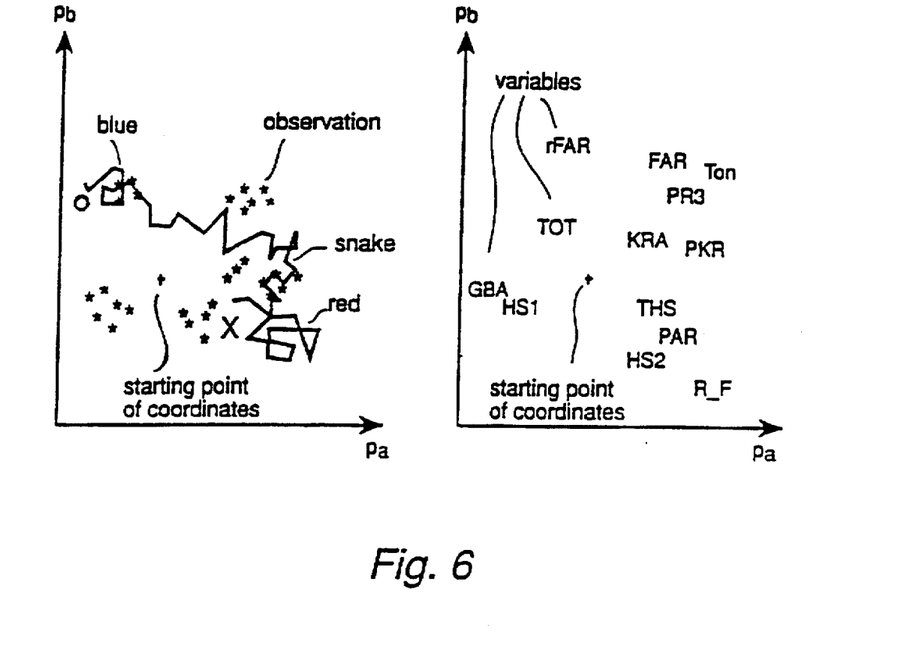
FIG. 6 illustrates in the left picture a score plot, which shows the state of the current process with the aid of a so-called "snake", which follows the course of the process, whereas the right picture shows a loading plot which, in turn, indicates how the process is influenced by process variables (TOT, FAR, PKR, etc.) introduced into the coordinate system.

Projection to latent structures, PLS, is a projection technique which offers a method of modelling complex relationships in a process. PLS decomposes two blocks of data, X and Y, into principal components as projections (FIG. 5). The two modelled blocks are similar to the solution according to the PCA method, but differ in that in PLS the projection is made to explain X and Y simultaneously for the purpose of obtaining the best possible correlation between X and Y. Thus, the PLS method serves to model the X block in such a way that a model is obtained which in the best way predicts the Y block. A PLS model can thus be very useful for predicting quality-related parameters, which are otherwise both expensive and difficult to measure. Instead of having to wait perhaps a week before a critical value from the quality control laboratory becomes available, this value can be immediately predicted in a model. FIG. 6 illustrates an example of how the study and monitoring of an industrial process can be visualized by means of a computer screen on-line. The left half of the figure shows a score plot, that is, a representation of the observations of the measured data of the process from two latent variables $t_a$ and $t_b$ reproduced with two principal directions $p_a$ and $p_b$ as axes in the coordinate system of the graph. The left half of the picture shows both a static and a movable picture. The static picture consists of points which describe the variation in the reference data which are used for building the model. If these reference data are chosen in the best way, the picture consists of good working ranges for the process as well as ranges which should be avoided in the process. The picture may be compared to a map containing information as to which conditions the operator should strive to direct the process to, and which conditions should be avoided.

On-line execution of measured process data results in calculated markings, that is, that observations made at a new time are reproduced as a new point in the plane which is represented by that plane which, in the form of the two selected principal directions $p_a$ and $p_b$, constitute the coordinates of the graph on the screen. This means that each new point contains information about all the relevant measured data because of the projection to the latent variables according to the PLS method. Changes in the process may then be reproduced on-line on the screen in the form of a line in the left half of the VDU. The changes are reproduced with the aid of a movable figure in the form of a curve which connects the observations at different times. The curve will thus move in time over the screen like a crawling "snake". To make the operator better understand the significance of the information provided by the crawling snake, the snake may be divided into a head and a tail, which are also illustrated in different colours and symbols. The head consists of present observations, whereas the tail is built up of "historical" observations. If an alarm is raised, that is, when the curve (the snake) detects "prohibited" areas, the snake may change colour, for example to red.

The movable curve is an aid to the operator to continuously monitor the status of the process by viewing the process through a "window" on the screen into the multivariate rooms of the process. The location of the snake's head is compared with the area where reference data of high quality have been attained. The ambition of the operator or the monitoring member of the process should be to control the process to this area.

To the right in FIG. 6 there is shown an example of other information which it may be imparted to the operator via the screen with the aid of the PLS method. The right picture is a reproduction of loading vectors, a loading plot. This is a map of how the score plot, that is, the curve in the left picture, is influenced by the individual variables in the process. The left and right picture halves also contain associated information. This means that the direction in the left picture has a direct correspondence in the right picture. The operator may receive guidance from the right picture if he/she is to control individual process variables for the purpose of moving the process (the "snake") to achieve better operating conditions for the process.

The use of the method described above means a powerful instrument in monitoring processes which are dependent on a large quantity of process variables in a simple and clear way. As examples of technical fields, within which process monitoring of industrial processes according to the described methods may advantageously be utilized, may be mentioned the pulp, paper, chemical, food, pharmaceutical, cement and petrochemical industries as well as power generation, power and heat distribution, and a wide range of other applications. However, the PCA and PLS methods, respectively, used according to the prior art suffer from a weakness in that the projection plane which built up of two principal directions, and to which plane observations are projected, are fixed and do not change during the course of the process. This means that changes in the swarm of points in the multidimensional space, which has constituted the base of the calculation of the principal directions $p_a$ and $p_b$, are not taken into account. At the same time new observation series are constantly added during the process, in which variable values may be changed, which means that the geometry of the point swarm in space may be changed and that the calculated principal directions which are intended to reflect the shape of the point swarm are no longer of interest. This is not reflected by the graphically reproduced information about the course of the process according to the above.

SUMMARY OF THE INVENTION

The present invention relates to a method for monitoring and control of an industrial or other technical process, in which the course of the process is dependent on a multiple of variables relevant to the process. The method involves a description of the relevant variables as a multidimensional room, wherein each variable represents an independent component in the room, that the observations of the variable values at a certain time represent a point in the multidimensional room, that the observations from a number of times form a point swarm in the room, that at least one first and one second principal direction of the point swarm are calculated, that the projections of the observations on these first and second principal directions are determined, that the observations are illustrated graphically in the plane which is formed by the first and second principal directions in the point swarm, further that the principal directions are continuously updated during the course of the process, whereby the graphic information becomes dynamic, and, finally, that the operator or the monitoring member of the process, based on the presented information, adapts members which influence variable quantities in the process such that the process is controlled to optimum operating conditions.

According to the prior art, information about the course of the process is obtained by projecting measured data onto a plane which is comprised in the variable space which describes the process. The novel feature according to the invention is that the plane to which measured data are projected, according to the PCA and PLS methods, dynamically follows the flow of new series of measured process data, the projection plane being able to rotate in the multivariate room which describes the process. This provides a constant monitoring of the process in relation to the present stage and not, as previously, in relation to a "process historical" stage.

The illustration of the course of the process may take place according to previously known technique, on-line or off-line in the form of a snake which crawls on a screen according to the above, or in the form of ordinary historical trend curves.

When the process is visualized with the aid of a snake crawling over a plane, this means according to the invention that the direction of crawling of the snake illustrates a direction of the process taking into consideration how variable quantities temporarily influence the model of the process, in that variable values which slide away in different directions in the process influence the above-mentioned point swarm to assume new geometries.

When showing the course of the process as a graph on a screen, reference data for the process are also plotted on the screen in the form of regions to which the process should be controlled. Also process-influencing parameters are plotted on the screen to indicate which variables in the process have a strong influence on the process when the process slides in a certain direction indicated by the direction of movement of the graph on the screen.

If the process is on its way into prohibited or non-optimum regions, which is indicated on the screen by the graph moving into regions which are marked on the screen as forbidden, the operator controls the process towards allowed regions by actively influencing at least one member in the process which influences the variable or variables which is or are denoted by the graph as being capable of being influenced by the member or members which restore the process to the norm or reference region plotted on the screen.

It is also possible, if desired, to automate the monitoring, by using known technique, by sensing which variable or variables can restore the process to the above-mentioned desired regions with known electronic devices, which then control the variable-influencing members in the process such that the process is maintained within given frames.

According to the invention, new current models of the process are calculated dynamically. By continuously comparing the last calculated model with a reference model determined for the process, a real-time calculated value of the distance of the process from the reference model is obtained. When this distance exceeds a value fixed for the process, it is practical to initiate an alarm. A variant of this alarm is arranged such that the most interesting part of the process, indicated as a graph in the form of a crawling snake on a screen, when this graph enters forbidden regions for the process, is coloured, for example, red. Other devices for calling attention requiring action are also to raise an alarm, for example, by means of a signal, a light, a lamp, etc.

In another variant of the invention, a third principal direction for the point swarm in the variable space is calculated, whereupon the observations are projected to the three-dimensional room which is defined and spanned by the three principal directions, and that the three principal directions according to the invention are continuously updated during the course of the process, and that the observations are illustrated graphically on-line as projections in the room spanned by the three principal directions, which also in this case may take place by a graph in the form of a snake crawling between the coordinates in the room to which the current observations of the process are projected.

Applying the described method, process automation is given a very powerful instrument for monitoring and controlling, in a well-arranged manner, also very complex processes.

DESCRIPTION OF THE PREFERRED EMBODIMENTS

According to the invention, modelling by means of PCA and PLS is used by dynamic updating of the process model by means of exponentially weighted observations and is described as multivariate generalizations of the exponentially weighted moving average, abbreviated EWMA (Exponentially Weighted Moving Average).

Principles and determination algorithms for utilizing EWMA and realizing dynamic models, which according to the invention make it possible to obtain optimum monitoring of a process, are presented in the following. Further, predicted control charts based on these models are shown.

Standard PCA and PLS models assume an independence of process times, that is, that no process memory is utilized. Since projected observations (scores) by means of PCA and PLS entail good "cross sections" of process data, a natural way to model "memory effects" would be to develop simple time-series models in these scores. One of the simplest models is available via EWMA, which provides both a good picture of the current status in a process and a "one-step-ahead" forecast about the process. In this way, an EWMA model based on multivariate projected observation (scores) from PCA and PLS constitutes a natural extension of multivariate model standards for process applications.

A generalization of EWMA into EWM-PCA and EWM-PLS consists of two parts. The first part is related to the use of scores instead of individual variables in control charts and predictions. The second part is the dynamic updating of the PCA and PLS models to allow the model to take into account the drift in the process.

The obvious field of application of EWMA-PCA/PLS is process monitoring and control. Multiple responses are common in all types of automatic process control today, both because it is simple and inexpensive to measure many process-influencing quantities and because complicated products/controls impose many demands on criteria which must be monitored and controlled to ensure high quality of the product/control. As an example to illustrate EWMA-PCA in this disclosure, we use a (49×17) matrix with collected measured data of 17 variables from a paper machine over a period of time of 49 equal time intervals. The 17 variables comprise values from measured quantities such as the weight of the paper pulp, the moisture content, the breaking stress of the paper, the velocity of the machine, etc. The method of utilizing EWMA offers, per se, also entirely different possibilities within fields which attract increasing interest, such as pollution of rivers, lakes, oceans, etc. When monitoring such pollution, a plurality of variables are measured where the method according to the invention would offer a clear and well-arranged way of presenting data. In the case of, for example, emission of substances/particles from an industry into a reception area, such monitoring would permit feedback of presented measured values and permit control of a change of components in the emissions.

In, for example, chemical/technical contexts, other sequences than changes are often studied over time. Natural polymers, such as cellulose, DNA and proteins are built up of sequences of a set of monomers, wherein local monomeric EWMA-PCA properties can be used to obtain information about such things as binding sites, etc. In such applications, it may be a natural thing to extend the exponentially decreasing weighs in both directions from the centre of the model.

In the following description of the model, to achieve the method according to the invention, designations according to the following table are used.

X a matrix with process variables (entries to predict Y)

Y a matrix with "result" variables in PLS (responses output values, product properties)

i,j index of observations, rows in X and Y; (i,j=1, 2, ... N)

N number of elements, observations, samplings, or process times; (rows in X and Y)

k variable index in X and Y; (k=1, 2, ..., K)

K number of variables in X or Y; (columns in X or Y)

\* used for designating a memory matrix for old values m index of response variables; (m=1, 2, ..., M)

M number of PLS Y variables; (columns in Y in PLS model)

$v_i$ weight of the observation i a component index, (a=1, 2, ..., A)

A number of components in the model

W matrix of PLS weights (dimension K×A)

$w_a$ columns in W, X weights of component a p loading matrix, dimension (K×A)

Q memory matrix of loadings (or PLS weights)

C matrix of PLS Y weights, dimension (M x A)

$c_a$ columns in C, Y weights of component a

T score matrix of X, dimension (N×A)

$t_a$ columns in matrix T, scores of component a

U matrix of u-scores, dimension (N×A)

$u_a$ columns in matrix U, second scores of component a $E_a$ X or Y residuals after component a, dimension (N×K)

$F_a$ PLS Y residuals after component a, dimension (N×M)

EWMA may be regarded as a model with two components. The first component concerns the creation of a modelling variable y and predicting this variable y at a subsequent point in time. The second component concerns the arrangement of a control chart based on the model.

Figure 7:
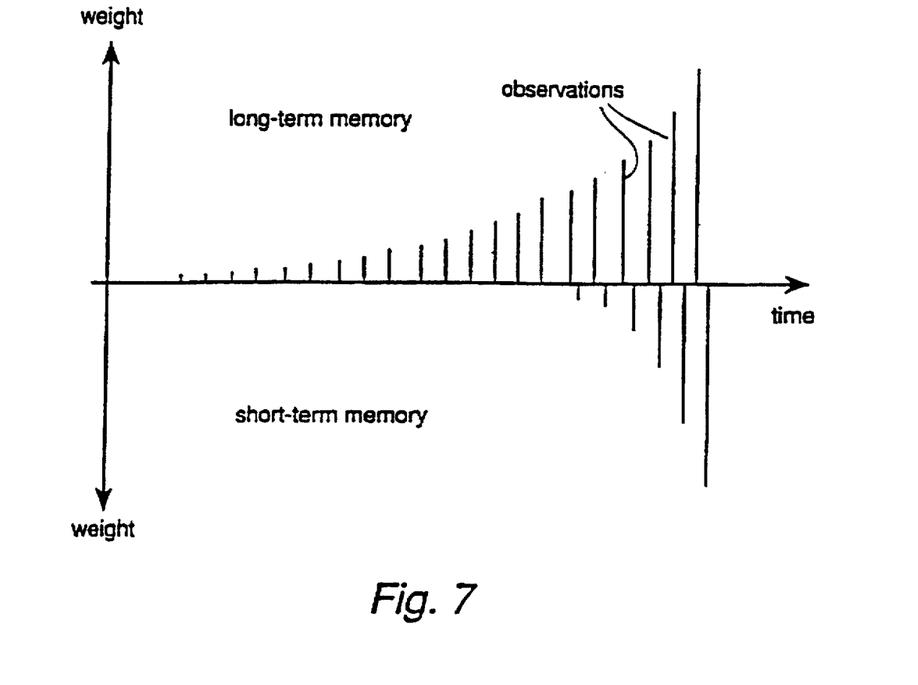
FIG. 7 illustrates the weighting of the observations in the monitored process in a long-term memory and a short-term memory, respectively, according to the method.

The basic idea behind EWMA is to model y as a weighted moving average, with the latest observations weighted heavier than earlier observations. Exponential weights $$v_i = \lambda(1-\lambda)^{i-1} \quad (1)$$

are used for the i'th observation which precedes the current one (i=t), see FIG. 7. This gives the predicted value at the time t+1 according to equations (2) and (3). These equations may at the same time be utilized to recursively update the EWMA model from time t to time t+1 according to:

$$\hat{y}_{t+1} = \lambda y_t + (1-\lambda)\hat{y}_t \quad (2)$$

$$= \hat{y}_t + \lambda(y_t - \hat{y}_t) = \hat{y}_t + \lambda e_t \quad (3)$$

Assuming that the residuals, $e_i$, have a constant variance $\sigma^2$, the variance of EWMA will be:

$$\text{Var(EWMA)} = \sigma^2 \lambda/(2-\lambda) \quad (4)$$

Figure 8:
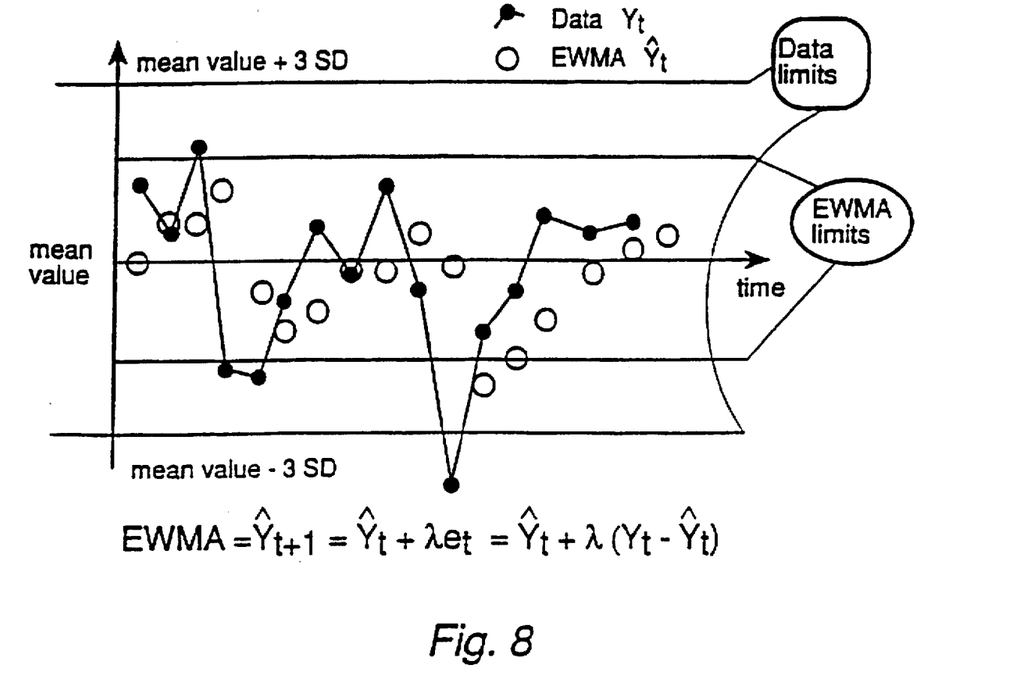
FIG. 8 shows the utilization of control limits in the form of limits to the standard deviation from the mean value of the process, which limits may be used in a monitoring system to justify intervention into the process.

A corresponding standard deviation (SD) may be used for creating control limits as, for example, three-sigma limits. Thus, the EWMA diagram can be used as a monitoring instrument for indicating if the process is significant at the side of the desired region to thereby justify an intervention. See FIG. 8. Since, on the other hand, the model provides us with a prediction of y at the next observation time, EWMA may also be used as a base for modifying the difference between the prediction and the score value, that is, an achieved dynamic process control. For this purpose, a modified EWMA is recommended as follows:

$$\text{EWMA} = \hat{y}_{t+1} = \hat{y}_t + \lambda_1 e_t + \lambda_2 \Sigma e_2 + \lambda_3 (e_t - e_{t-1}) \quad (5)$$

The values of the parameters $\lambda_1$ to $\lambda_3$ are estimated from the process history.

The principal component analysis, PCA, is usually based on an analysis of an (N×K) data matrix, Y, which starts with a matrix, centred and scaled into uniform column variance. PCA models this normalized matrix as a product of an (N×A) score matrix T, and an (A×K) loading matrix, P', as well as an (N×K) residual matrix, E. The number of product terms, the components A, define the dimensionality of the PC model. If the number of product terms, A, is equal to, or greater than, the dimension of X, N or K, the residuals E are identically equal to zero. The number of significant components, A, may be estimated in a plurality of ways; here we advocate cross-validation.

$$Y = \Sigma_a t_a * p_a' + E = TP' + E \quad (6)$$

The scores (the columns in T) are orthogonal and in many ways provide the best summary of data. This provides a good picture of the process if these scores are plotted into a diagram as dependent on time.

For an unweighted calculation of the principal components, $t_a$ and $p_a$, division into singularity values (SVD) is a method to prefer if all the components are desired (a=1,2, ..., min(N,K)). If only a small number of first principal components are of interest, a method known under the name NIPALS (see, e.g., H. Wold, Nonlinear estimation by Iterative Least Squares Procedures, Research Papers in Statistics, Wiley, New York 1966) may be applied as this method is faster since only the first components mentioned are determined. The NIPALS interpretation of the loading values ($P_{ak}$) as partial regression coefficients makes the calculation of PC models uncomplicated, as is shown below.

$$E_{a-1} = \{E_{ik,a-1}\} = x - \Sigma_b^{a-1} t_b * p_b' \quad (7)$$

$$e_{ik,a-1} = t_{ia} * p_{ak} + e_{ik} \quad (8)$$

$$p_{ak} = \Sigma_i^N (e_{ik} * t_{ia}) / \Sigma_i^N (t_{ia} * t_{ia}) \quad (9)$$

The elements in pa are normally normalized to the unit length ($\|p_a\|=1$), which gives $$t_{ia} = \Sigma_k y_{ik} p_{ak} \quad (10)$$

The standard deviation (SD) of the row i of the residuals, $s_i$, is a measurement of the distance between the i'th observation vector and the PCA model. For this reason, this standard deviation, DMod, is often referred to as the distance to the model.

To develop an exponentially weighted moving principal component analysis (EWMA), which is utilized according to the invention, two steps are required. The first step, which comprises updating and prediction (forecasting) of the process values at the next point in time t+1, is uncomplicated if an existing PCA model for the process is assumed. The second step, updating this PCA model for a process which is driving, proves to be complex.

The forecasting part is achieved by means of K multivariate process responses, $Y=\{y_1, y_2, \ldots, y_m, \ldots, y_M\}$, and a PCA model with A components which is determined from these, Y data. A process time point has A scores, $t_{ia}$ (a=1, 2, ..., A), associated with it, which form a row in the score matrix T.

Now, assuming a certain auto-regressive auto-correlation structure and a stable cross-section correlation structure in the data set, and thus a stable PCA model, the EWMA values in the scores $t_a$ will provide us with a base for multivariate and dynamic process control.

Here we assume that the process is driven by only A independent "latent variables", which indirectly are "observed" by the Y variables and determined as scores $t_a$ (a=1, 2, ..., A). This gives two alternatives for achieving control charts. Either one control chart may be maintained for each PC component, a, which is justified if the components have a separate physical meaning. An additional control chart may be constructed from the residuals of the standard deviation, the DMod table. A second alternative is obtained by combining all the significant t and DMod into one single table, which, however, leads to a loss of information about the separate model dimensions.

The prediction about the score vector t (with A elements) at the time t+1 is analogous to the equations (2) and (3) according to:

$$\hat{t}_{t+1} = \lambda t_t + (1-\lambda)\hat{t}_t \quad (11)$$

$$= \hat{t}_t + \lambda(t_t - \hat{t}_t) \quad (12)$$

The more elaborate form analogous to equation (5) is obvious. These thus predicted scores forecast the vector y of M variables according to:

$$\hat{y}_{t+1} = \hat{t}_{t+1} p' \quad (13)$$

The variance of $\hat{t}_{t+1,a}$ is directly given by equation (4) with $\sigma_a^2$ determined by means of scores from a long series of "historical" data in the process. Because of a non-full rank of the matrix Y, classical variances of $\hat{y}_{t+1}$ cannot be determined without additional assumptions. If "partial least-squares assumptions" are made about some independent regularity of each $y_k$, an acceptable variance of the forecasted vector $y_k$ would be:

$$\text{Var}(\hat{y}_k, t+1) = \Sigma_a p_{ka}^2 \sigma_a^2 \quad (14)$$

In the model according to the invention, an updated dynamically exponentially weighted PCA is further required, a way of handling the risk of rotation in the model, which will be discussed below, as well as closer definition of centering and scaling. These questions will be dealt with one at a time.

To achieve a weighed PCA, we are using exponentially decreasing observation weights, $v_i$, according to equation (1), whereby, with the aid of the weighted least-squares formulas and equation (9), the following is directly obtained:

$$p_{ak} = \Sigma_i^N(v_i * e_{ik} * t_{ia}) / \Sigma_i^N(v_i * t_{ia} * t_{ia}) \quad (15)$$

Consequently, the NIPALS algorithm can be utilized directly with only minor modifications when calculating EWM-PC loadings by using the exponentially decreasing weights, $v_i$, according to equation (1). For a single, fixed Y, the other NIPALS steps remain unchanged. The unweighted scores, $t_a$, however, are no longer orthogonal, whereas the weighted $t_{ia}\sqrt{v_i}$ are orthogonal.

Prior to a multivariate modelling, data are usually centered by subtraction of the column mean values from the data matrix. The mean vector may be interpreted as a first loading vector, $p_0$, with a corresponding score vector, $t_0$, which has each element equal to 1/N.

In the present application, there are two natural ways to proceed for determining a centering vector. In one case, a constant mean value vector is used, determined from a long process history. In the second case, EWMA is used for each variable, $(y_k)$, with a much smaller $\lambda$ than what is used in the EWMA-PCA weights $(v_i)$. To stabilize the estimation of this EWMA$_k$, this is calculated by using the residuals of the PC model instead of (normalized) raw data. Thus, the observation vector $y_{t+1}$ is centered and scaled by using the parameters at time t. Then, the predicted values are subtracted (by means of equation (13)), to give the residuals $e_{t+1}$, which are used to update EWMA$_k$ in accordance with the equations (1) and (2).

After the centering, data are scaled by multiplying each column in the data set by a scalar weight $\Phi_k$. By means of variance scaling (autoscaling), $\Phi_k$ is calculated as $1/s_k$, where $s_k$ is the standard deviation for columns. This again leads to two obvious choices; to calculate $s_k$ from a long process history or to use an updated computation of $s_k$ based on weighted local data. A third option is based on a slowly updated "spanning" database, which is described below. Important variables may be scaled up by thereafter multiplying $\Phi_k$ by a value between 1 and 3 and inversely. Other less important variables may in a corresponding way be scaled down.

Figure 9:
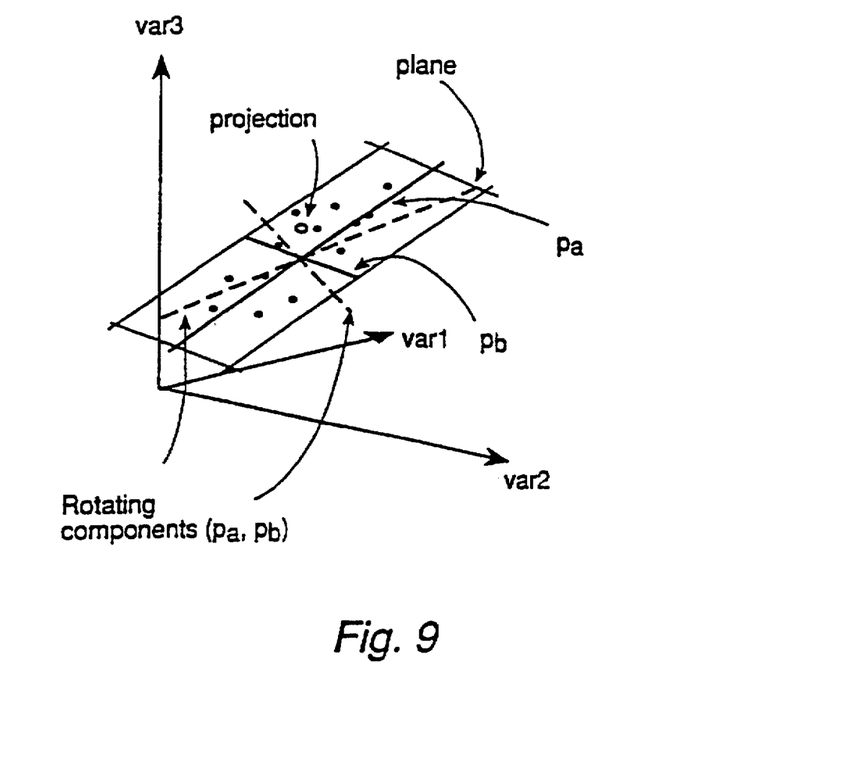
FIG. 9 explains how the projection plane, onto which all the observations are projected according to the invention, under certain circumstances may be subjected to an unintentional rotation of the model.
Figure 10:
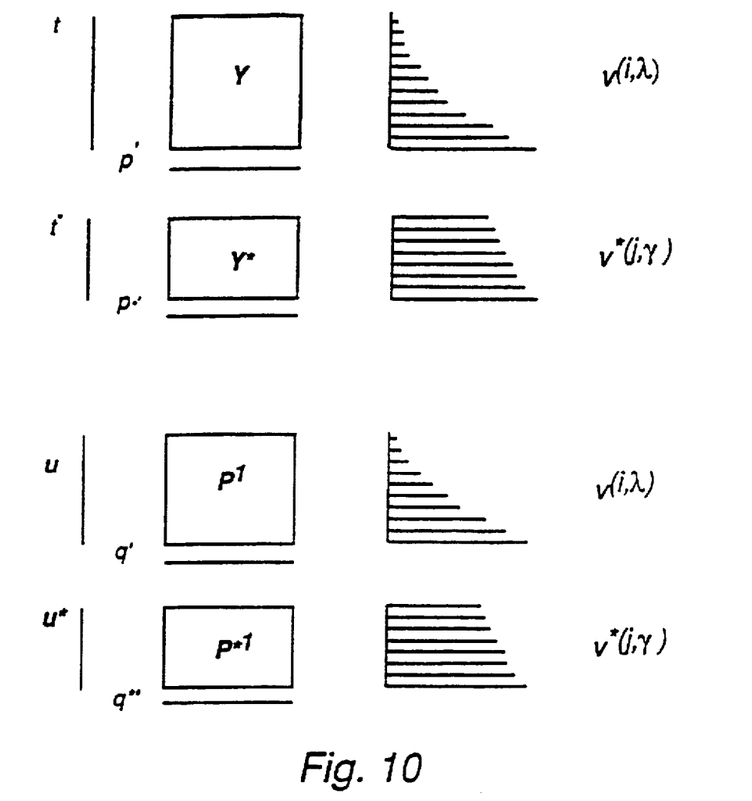
FIG. 10 denotes the exponential weights v in the data block and the loading block in the EWM-PCA algorithm.

The above-mentioned rotation problem, which may arise when that point swarm of observations in space, which in the model is projected onto first and second principal directions, more or less has a circular propagation. In such situations, each bilinear model, both PCA and PLS, is partially undefined with respect to rotation. See FIG. 9. In dynamically updated models, this leads to a potential instability; when a new process observation is introduced in the model, this may lead to a rotation of the immediately preceding model, even if the new observation point lies very close to the model plane. This manifests itself as a jump in the score plot shown, which is incorrectly interpreted as a change of the process itself. To avoid this unintentional rotation, loading vectors from the preceding model are saved in an auxiliary matrix, a "P-memory" matrix, ("W-memory" in PLS), here designated Q. Thereafter, when estimating the updated model, this P-memory matrix, exponentially weighted, is included according to the multiblock PCA/PLS algorithm published in "MULDAST NEWS", Report from the MULDAST symposium in Umeå, Jun. 4–8, 1984, S. Wold et al. This can be seen as a Bayesean estimation of the PC model, where information from previous events is stored in Q, the P-memory matrix. See FIG. 10.

The consequence of including a memory matrix is that the updated loading vectors $p_a$, (or $w_a$ in PLS) are forced not to differ too much from the preceding loading vectors. The balance between new and old values is checked by an adjustable parameter, α. The full algorithm is given below.

A further difficulty to take into consideration is that, when losing the memory during an instability period, each recursive model estimation has a tendency to lose the information about previous periods. This is due to the fact that if the process is stable sufficiently long, only data without appreciable variation are retained and earlier data are weighted down and will have insignificant influence in the exponentially decreasing weights.

To force the model to remember important events further back in its history, a second auxiliary matrix is also used, a reference data matrix, Y*, in the model determination. This matrix contains those observations (points) in the process which span all the space of previous observations and which are updated whenever a new process observation has a score ($t_a$) which exceeds a certain fixed limit value. These limit values may be derived from "historical" data, that is, previously occurring extreme values, or be preset by the process operator. By analogy with this, an additional reference matrix for the loading vectors, Q*, is involved such that the process memory regarding the loading vectors does not disappear during some period of instability.

As in the P-memory matrix (Q), the rows in the reference matrices (Y* and Q*) are exponentially weighted, but with a slower decrease by the use of a smaller value γ which is used instead of the greater λ in equation (1).

Many processes now and then generate "spikes", that is, deviating values which should not be included in the modelling work. The simplest way of handling these spikes is to calculate the distance in the Y-space between a new observation and the preceding one. Observations with widely differing values, which create scores ($t_a$) far beyond the "norm ranges" compared with the values of reference data according to the above, are discarded after a message to the operator, unless several consecutive process observations demonstrate a consistently deviating pattern.

Applying the method according to the invention (EWM-PCA or PLS) to a set of historical data with a given set of parameter values $\lambda_1$ to $\lambda_3$, gives predicted errors of one-step-ahead forecasts for each score, $t_a$, and for each y-variable. The sum of the squares of the differences between actual values and predicted values thus forms an estimation of predictive power of the model in the same way as with cross-validation. This sum, PRESS, has components from each score, or y-variable, or both, weighted according to their perceived importance. To find the best combination of the values of $\lambda_1$ to $\lambda_3$, "Response Surface Modelling" (RSM) is recommended. In this approach, 15 models with different parameters are evaluated in parallel. The 15 parameter combinations (j=1,2, . . . ,15) are selected according to a "Central composite Inscribed" (CCI) design with low and high values being around, for example, 0.15 and 0.45. This is then followed by a regression of y=log ($PRESS_j$) against the extended design matrix X=λ, which gives a predicted combination of parameter values which provides a minimum of PRESS.

A step-by-step overview of the process model according to the invention will be presented in the following:

1. Select parameters $\lambda_1$ to $\lambda_3$ in equation (5) (or eqs. 11, 12) in the simplest case. This is done based on experience or estimation of values which give the best predictions in a longer process history.

2. Select a starting matrix, $Y_0$, in accordance with process data at the beginning of the time interval of interest. If PLS modelling is used, the two starting matries $X_0$ and $Y_0$ are needed. From these, column mean values and standard deviation are calculated for centering and scaling of data.

3. Use weighted PCA (or PLS) to derive an initial model of the process from normalized data according to step 2.

4. Initiate the data memory matrix by including the data from $Y_0$ in PCA and $\lambda_0$ in PLS which correspond to the maximum and minimum score values of each model dimension, a.

5. Initiate the loading or weighting memory matrices, $Q_a$, ($P_{mem}$ or $W_{mem}$), one for each component, a, with $p_a'$ or $w_a'$ as the first and single rows.

6. Initiate Q*, the long-term spanning $P_a$ or $W_a$ matrices, identical with those in step 5.

7. Make a one-step-ahead forecast of scores $t_{a,t+1}$. Then calculate predicted y values from $t_{a,t+1}$ and P' (PCA) or C' (PLS).

8. Fetch the observed values $y_{t+1}$ (and $x_{t+1}$ for PLS). Investigate whether they contain spikes. Center and scale them by using normalization parameters from the previous step (time=t) and calculate the current scores $t_{a,t+1}$ and the remaining residuals $e = y_{t+1} - t_{a,t+1} P_t'$.

9. Update the centering parameters by means of the residuals e.

10. Update the EWM-PC or PLS model by iterating the algorithm to convergence.

11. Update the memory matrices $Q_a$, ($P_{mem,a}$ or $W_{mem,a}$ for PLS), and, if justified, also the data memory matrix Y and the matrices P, W, $Q^*_a$ and the memory matrix Y*.

The difference between EWM-PCA and EWM-PLS may be described such that, in the "PLS" situation, the process data have been divided into two (or more) blocks; X referring to input data and Y referring to "output data", that is, a performance and quality assessment of the product. It may here be desired to monitor and forecast the process (X), the result (Y), or both. The algorithm for updating the model becomes somewhat more complicated by the inclusion of the Y block. The data memory will also have a Y block. Forecasts of Y are made directly from the forecasted X scores (t), as shown in step 7 above, and X data in the same way as with EWM-PCA. The inclusion of the Y block stabilizes the model and reduces the constraints on P.

Figure 11:
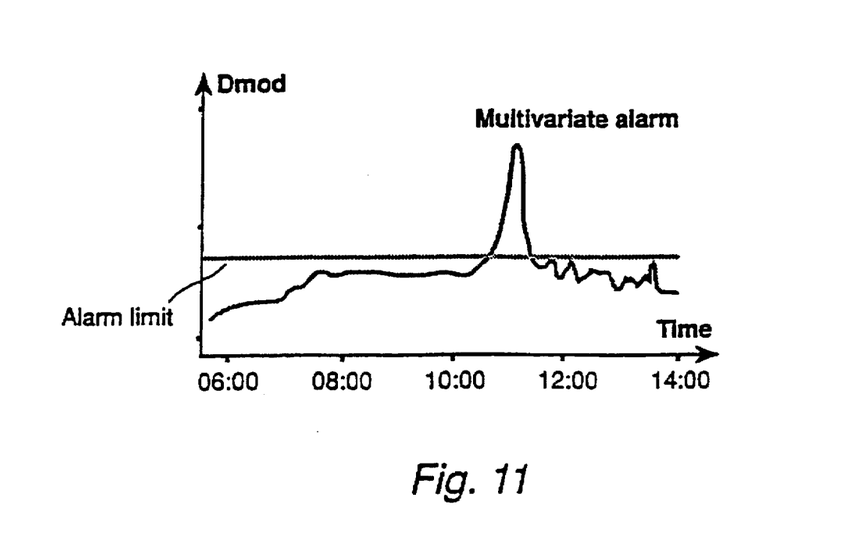
FIG. 11 shows a so-called "distance-to-model" curve or DCL (Distance-To-Class) curve, which has been obtained explicitly for presentation of multivariate processes. The DCL curve describes the distances to the limits of the reference model. A multivariate alarm is defined depending on the level of the DCL (Dmod).

One of the most determining advantages of the process model according to the invention is that it becomes possible to follow the course of the process dynamically with the aid of a display, wherein first scores ($t_1$ and $t_2$) are plotted against each other or separately versus time. Such a representation gives a good picture of how the process is developed. The distance to the model, Dmod, that is, the standard deviation of the Y residuals (X residuals for PLS) may be included as a separate reproduction or be included in the score reproduction as colour in dependence on the distance mentioned. See FIG. 11.

Tests with process monitoring according to the model have been carried out experimentally, inter alia on ore treatment, which has allowed the process to be monitored and clearly shown when the process does not lie within the normal framework.

Further, in summary, it can be said that the present model with EWM-PCA and EWM-PLS provides us with multivariate windows on a dynamic process, wherein the dominating properties of the development in the process are shown as scores plus a measured value of how far process data (new observations) lie from the model. If there is an auto-correlation structure in the scores, one-step-ahead forecasts of process scores ($t_a$) and process variables (y or x) may be used for diagnosing and controlling the process.

The algorithms for modelling the process are shown in the following step by step.

It is assumed that suitable values of the-parameters $\lambda_1$ to $\lambda_3$ are available, both as values of centering and scaling constants, EWMA$_k$ and $\Phi_k$ for the variables ($x_k$, $y_k$).

The EWM-PC algorithm

1. Select suitable parameter values ($\lambda_j$,$\gamma$).
2. Start with an initial matrix $Y_0$, magnitude $N_0 \times K$. Set $Y=Y_0$. The memory matrices Y* and Q are initialized as empty.
3. The weights $v_i$ and $v_i^*$ are calculated according to equation (1) with the parameters $\lambda$ and $\gamma$. The weighted mean value of each variable (k) is calculated from Y:

$$EWMA_k = \Sigma_i v_i^* y_{ik}/\Sigma_{i,i}^*$$

The scaling weights ($\Phi_k$) are calculated from both Y and Y* (note that Y* is centered):

$$S_k^2 = |\beta \Sigma_i v_i (y_{ik} - EWMA_k)^2 + (1-\beta) \Sigma_j v_j^* Y_{jk}^{*2|\beta\Sigma} v_i + (1-\beta)\Sigma_j v_{j*\text{wk}} = 1/s_k$$

The constants are left as zeros with zero weight. Important variables may be scaled up or down by multiplication of the scaling weights above by a suitable adjuster between, for example 0.3 and 3. The parameter D which determines the relative effect on the current data and reference data may lie somewhere between 0.1 and 0.9 depending on the stability of the process.

4. Center and scale Y with the centering parameters EWMA$_k$ and the scaling parameter $\Phi$k.

$$Y_{ik}(\text{normalized}) = (y_{ik}(\text{row}) - EWMA_k)^*\Phi_k$$

5. The central part of the EWM-PC algorithm is initiated here: the determination of the weighted PC model. The additional steps caused by cross-validation are not explicitly shown; they substantially comprise elaboration of the algorithm below several times with different parts of data deleted and afterwards predicting the deleted data from the model. The model dimension, A, with the smallest prediction error (PRESS) is selected, with preference for a smaller A, if PRESS is largely the same for different model dimensions.

(i) Set dimension index a to one.
  (ii) As starting vectors for $p_a$ and $q_a$ (loading vector), the ones from the previous time points are used. At the very first time, the last row in $Y_0$ is used, normalized to length 1.
  (iii) Calculate the scores $t_{ia}$. To compensate for missing data, dummy variables ($d_{ik}$) are used, which are zero if element $y_{ik}$ is missing, otherwise equal to one.

$$t_{ia} = \Sigma_k d_{ik} y_{ik} p_{ka}/\Sigma_k d_{ik} p_{ka}^2$$

If there is a reference matrix, Y* the corresponding scores, $t_{ia}^*$, for this matrix are calculated by using $d_{jk}$ and $y_{jk}^*$ instead of $d_{ik}$ and $y_{ik}$ in the above equation.

(iv) Calculate the loading vectors, $p_{ka}$, using the same $d_{ik}$ for compensation of missing data.

$$p_{ka} = \Sigma_i d_{ik} y_{ik} t_{ia}/\Sigma_i d_{ik} t_{ia}^2$$

Normalize $p_a$ to length one;

$$p_a = p_a/\|p_a\|$$

If there is a reference matrix, Y*, the corresponding loading scores, $p_{ka}^*$, for this matrix are calculated by using $d_{jk}$ and $y_{jk}^*$ and $t_{ia}^*$ instead of $d_{ik}$, $y_{ik}$ and $t_{ia}$ in the above equation.

Form $p_a$ as the weighted combination of two calculated $p_a$ values.

$$p = \beta p_a + (1-\beta) p_a^*$$

Normalize the new $p_a$ to length one.

(v) Check the convergence of $$\|p_{a,\text{new}} - p_{a,\text{old}}\|/\|p_{a,\text{new}}\|,$$ which must be smaller than $10^{-6}$ to indicate convergence. If convergence exists, proceed with step (ix), otherwise step (vi).

(vi) If the calculation is made at a first time, return to step (iii). Otherwise, continue to step (vii).
  (vii) Calculate the scores $u_a$ and $u_a^*$ for the loading matrix P and the reference matrix P*, respectively.

$$u_{ia} = \Sigma_k p_{\text{mem},a,ik} p_{ka}/\Sigma_k p_{ka}^2$$

$$u_{ia}^* = \Sigma_k p_{\text{ref},a,ik} p_{ka}/\Sigma_k p_{ka}^2$$

(viii) Calculate the "loadings" of the two loading and reference matrices according to:

$$q_{ka} = \Sigma_i p_{\text{mem},a,ik} u_{ia}/\Sigma_i u_{ia}^2$$

$$q_{ka}^* = \Sigma_i p_{\text{mem},a,ik} u_{ia}/\Sigma_i (u_{ia}^*)^2$$

Form $q_a$ as the weighted combination of two calculated $q_a$ values.

$$q_a = \beta q_a + (1-\beta) q_a^*$$

Normalize this new $q_a$ value to length one. Use the weighted combination (weight $\alpha$) of this vector and $p_a$ (weight 1-$\alpha$) and return to step (iii).

(ix) If convergence exists, the final $t_a$ and $t_a^*$ for the two data blocks are calculated, and from these temporary loading vectors which are used only to form the residuals to provide data in the next model dimension calculations. This is necessary to preserve orthogonality of the scores and is analogous to the orthogonalization step w→t→p in ordinary PLS regression.

After this, the residuals $Y - t_a p_a'$ and $Y^* - t_a^* p_a^{*\prime}$ are formed. Add one to the model dimension (a=a+1) and proceed with the next dimension by using the residuals Y and Y* as the data matrices in this next dimension.

(x) The algorithm is terminated when the number of dimensions, a, of the model equals the desired number of "significant" dimensions (variables), A, in the model, which is determined by cross-validation, or based on experience.

If instead an EWM-PLS algorithm is used, the difference between these is that the latter (PLS) includes both X blocks and Y blocks for data and reference data, respectively. By replacing Y by X and Y* by X*, loadings by PLS weights and p by w in the algorithm above, some sub-steps are added in step (iii) in the above algorithm. After calculating the scores $t_a$ and $t_a^*$, these are used for calculating Y weights, $c_a$ and $c_a^*$, respectively, which in turn leads to Y scores, here designated $r_a$ instead of $u_a$.

(iiia) Y and Y* weights $$c_{ma} = \Sigma_i d_{in} y_{in} t_{ia}/\Sigma_i d_{in} t_{ia}^2$$

and analogously for $c_{ma}^*$.

(iiib) Scores $t_a$ and $t_a^*$ $$r_{ia} = \Sigma_m d_{in} y_{in} c_{ma}/\Sigma_m d_{in} c_{ma}^2$$

and analogously for $r_{ia}^*$.

These scores, r and $r_{ia}^*$, are then used instead of t and t*, respectively, to calculate the PLS weights in step (iv).

Finally, after convergence, the residuals ($F_a$) of each Y block are formed by subtracting the relevant t vector multiplied by the relevant c vector. These residuals are then used as Y and Y* in the next dimension.

After convergence of the above algorithm, the resulting scores (only t and u values) are compared with maximum and minimum values with corresponding scores for the reference data and the loading matrices. Thus, when the reference matrices are initially empty, the data vectors corresponding to the greatest and smallest t and u values for each model dimension are saved in the reference data matrix Y* and P*, respectively. The extreme scores are saved for later comparisons. In following updates, a score value which is below the minimum or above the maximum previous score with the same dimension means that the corresponding data vector is included in the reference matrix and a new score value is saved. Two variants of Y* may be noted, one where old data are deleted from Y* and where no exponential weighting of Y* is made, and another, recommended variant, where Y* is extended with the new data vector by using a slowly decreasing exponential weighting of Y*. The same principles are used for the reference matrices for loadings or PLS weights.

The described algorithm forms the basis of how a multivariate process can be illustrated graphically, as mentioned above in the description of the invention. On the basis of observed facts, as, for example, because of the drift of some individual variable, the process may be restored to a normalized position by the fact that the variable in the process may be directly influenced.

Physically, the process monitoring according to the invention is achieved by measuring the measured data of relevant quantities by means of measuring devices for the respective physical quantity in the monitored process in a known manner. The measured values are passed via a process link to a computer, which is programmed to create models of the process according to the invention. The model or models are presented graphically on a screen, where according to the invention the process in its entirety is projected onto a plane or a hyperplane and where the projection contains all relevant information about the process, which makes it possible for the operator to take accurate action, based on facts, in the form of intervention in the physical quantities of the process, for example by adjusting the pressure or temperature levels, contact forces for rolls in a machine, etc., all according to which is indicated according to the visualization of the process. This type of information and the possibility of physical intervention in the process have not existed according to the prior art, since a real-time on-line study of the effect of many quantities on one another in a process has not been possible.

Figure 12:
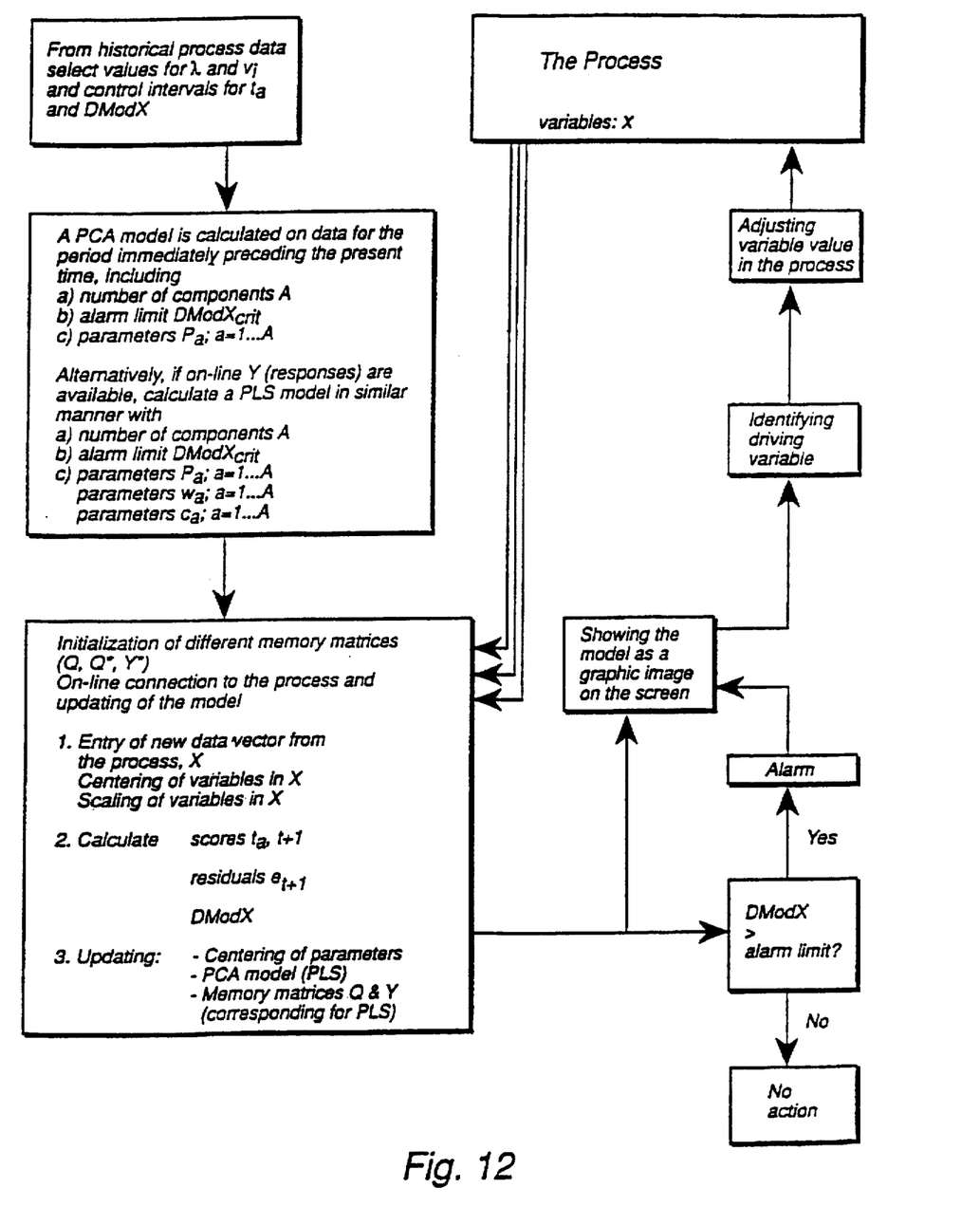
FIG. 12 shows a schematic flow chart of the calculation steps in the calculating units which carry out the calculations to obtain the model of the process as well as the distance to the reference model.

The calculations for the different steps to obtain the model of the process, referred to according to the invention, are implemented by calculating units, which are schematically reproduced in FIG. 12 where a clear overview of the calculation steps is given by means of a flow chart. If, in step 2 in FIG. 12, $t_{a,i+1}$ and/or DModX end up outside the allowable control interval, different loading plots are used to identify which process variables ($x_k$) have caused the process to leave its operative norm range, whereby the variable or variables which have caused the drift in the process are adjusted to values which are predicted to restore the process to a norm range as soon as possible.

We claim:

1. A method for monitoring a multivariate process comprising the steps of:

registering measured values of variables associated with said multivariate process as an observation at a predetermined time;

describing the variables as a multidimensional space, wherein each variable represents one dimension in the space;

representing each observation as a point in the multidimensional space, whereby a series of observations carried out at different times will be represented by a point cluster in space;

calculating for the point cluster at least one first and one second principal directions in space;

determining projections of the observations onto the first and second principal directions, whereby a model of the multivariate process is obtained;

updating during the course of the multivariate process the first and second principal directions of the point cluster in space, whereby the model of the multivariate process is dynamically adapted to the multivariate process in real time.

2. A method according to claim 1, wherein the multivariate process is illustrated as a picture on a screen, wherein the first and the second principal directions define a plane shown on the screen, wherein the projections of the observations are illustrated as points on the screen, and wherein the multivariate process is displayed in the form of a set of connected points which moves over the screen from one point to another point representing consecutive observations of the process over time.

3. A method according to claim 1, wherein the multivariate process is illustrated as a picture on a screen, wherein said first, said second and a third principal directions define a three-dimensional space which is shown on the screen, wherein the projections of the observations are illustrated as points on the screen, and wherein the multivariate process is displayed in the form of a set of connected points which moves over the screen from one point to another point representing consecutive observations of the process over time.

4. A method according to claim 2 or 3, wherein the multivariate process is illustrated by determining the residual standard deviation between a latest observed vector presentation of the process and an on-line updated model of the process used as a quantity indicating said residual standard deviation, and by a set of connected points on the screen changing color in dependence on said residual standard deviation.

5. A method according to claim 4, wherein said set of connected points is displayed on said screen using a first color when said residual standard deviation is within said normal range and using a second color when said residual standard deviation is outside of said normal range.

6. A method according to claim 2 or 3, further comprising the step of:

initiating an alarm when the set of connected points enters a predefined range which lies outside said normal range for the multivariate process.

7. A method according to claim 2 or 3, wherein a part of the multivariate process which is of current interest is displayed more brightly on said screen.

8. A method according to claim 2, wherein positions of the individual variables are projected onto said plane, and a midpoint of the point cluster in this plane is illustrated as points on the screen.

9. A method according to claim 8, wherein said multivariate process, indicated in the form of a set of connected points as well as a score plot, is simultaneously displayed in said plane defined by the first and second principal directions on separate or on the same screen image, whereby the movement of the set of connected points over the screen can be immediately related to multivariate process-driving variables, whereby the direction of the movement of the set of connected points away from the midpoint of the point cluster indicates an influence on the multivariate process by one or more variables which in the score plot lie in the same direction of travel as the movement of the set of connected points which indicates the influence of variable/variables in drift in the process.

10. A method for monitoring a multivariate process, comprising the steps of:

registering measured values of variables associated with said multivariate process as an observation at a certain time;

describing the variables as a multidimensional space, wherein each variable represents one dimension in the space;

representing each observation as a point in the multidimensional space, whereby a series of observations carried out at different times are represented by a point cluster in space;

calculating for the point cluster at least one first and one second principal directions in space;

determining projections of the observations onto the first and second principal directions, whereby a model of the multivariate process is obtained;

updating during the course of the multivariate process the first and second principal directions of the point cluster in space, whereby the model of the process is dynamically adapted to the process in real time; p1 calculating a residual standard deviation between a latest observed vector presentation of the multivariate process and an on-line updated model of the multivariate process; and initiating an alarm when the residual standard deviation of the multivariate process to the model exceeds a predetermined limit.

11. A method according to claim 10, wherein the residual standard deviation is displayed as a function of the observations made over time.

12. An apparatus for monitoring a multivariate process comprising:

means for registering measured values of variables associated with said multivariate process as an observation at a predetermined time;

means for describing the variables as a multidimensional space, wherein each variable represents one dimension in the space;

means for representing each observation as a point in the multidimensional space, whereby a series of observations carried out at different times will be represented by a point cluster in space;

means for calculating for the point cluster at least one first and one second principal directions in space;

means for determining projections of the observations onto the first and second principal directions, whereby a model of the multivariate process is obtained; and means for updating during the course of the multivariate process the first and second principal directions of the point cluster in space, whereby the model of the multivariate process is dynamically adapted to the multivariate process in real time.

13. An apparatus according to claim 12, wherein the multivariate process is illustrated as a picture on a screen, wherein the first and the second principal directions define a plane shown on the screen, wherein the projections of the observations are illustrated as points on the screen, and wherein the multivariate process is displayed in the form of a set of connected points which moves over the screen from one point to another point representing consecutive observations of the process over time.

14. An apparatus according to claim 13, wherein the multivariate process is illustrated by determining the residual standard deviation between a latest observed vector presentation of the process and an on-line updated model of the process used as a quantity indicating said residual standard deviation, and by a set of connected points on the screen changing color in dependence on said residual standard deviation.

15. An apparatus according to claim 14, wherein said set of connected points is displayed on said screen using a first color when said residual standard deviation is within said normal range and using a second color when said residual standard deviation is outside of said normal range.

16. An apparatus according to claim 12, wherein the multivariate process is illustrated as a picture on a screen, wherein said first, said second and a third principal directions define a three-dimensional space which is shown on the screen, wherein the projections of the observations are illustrated as points on the screen, and wherein the multivariate process is displayed in the form of a set of connected points which moves over the screen from one point to another point representing consecutive observations of the process over time.

* * * * *